C. W. STUBBS.
SCRAPER FOR CLEANING LAKE AND RIVER SHORES.
APPLICATION FILED OCT. 29, 1910.
991,665.
Patented May 9, 1911.
2 SHEETS—SHEET 2.
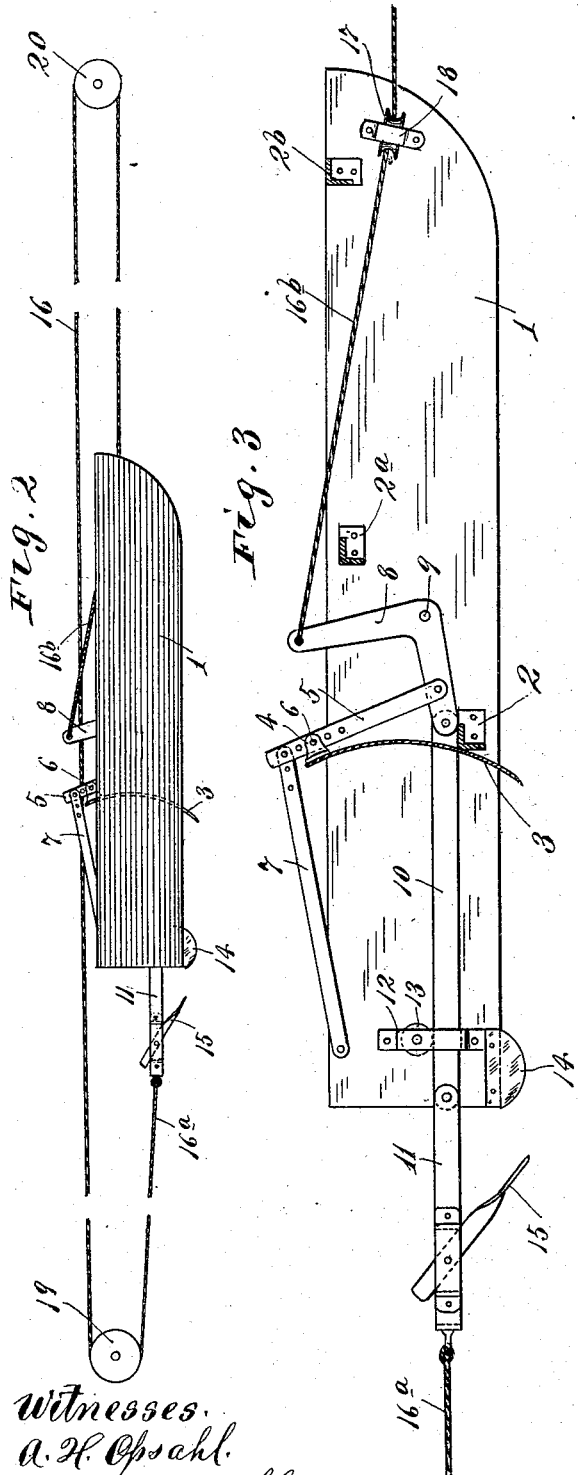
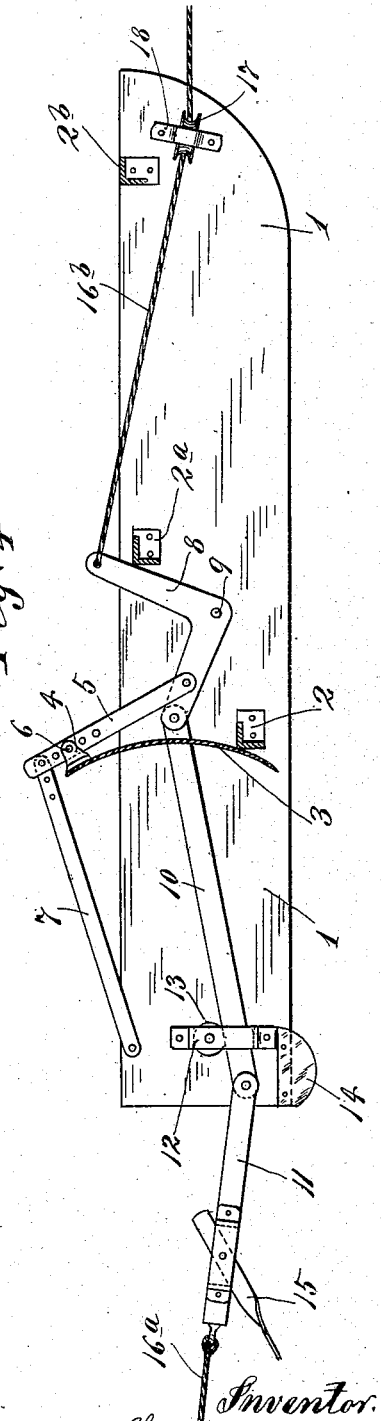
Witnesses
A. H. Opsahl
Harry Opsahl
Inventor
Charles W. Stubbs
By his Attorneys
Williamson Merchant

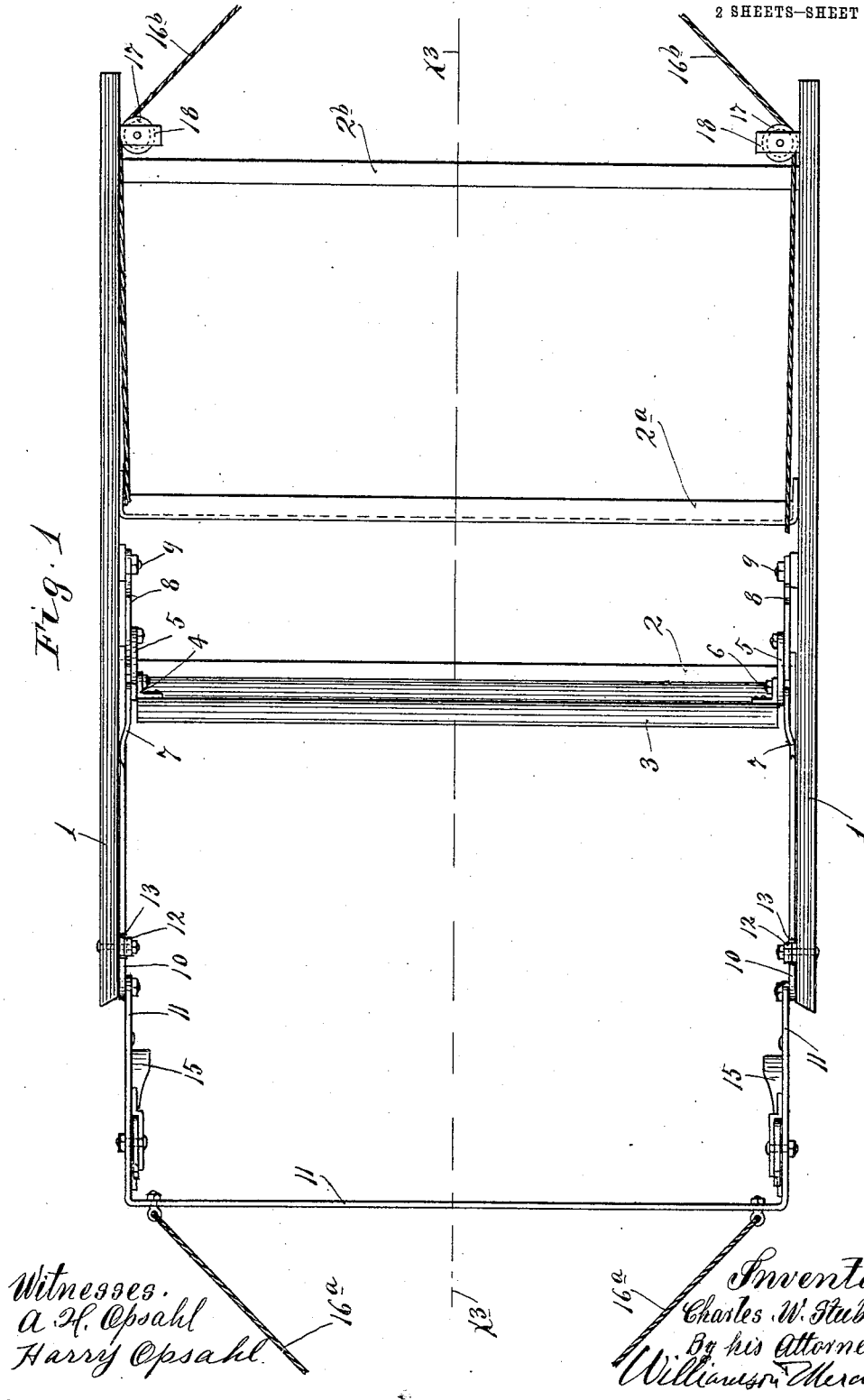

UNITED STATES PATENT OFFICE.

CHARLES W. STUBBS, OF MAPLE PLAIN, MINNESOTA.

SCRAPER FOR CLEANING LAKE AND RIVER SHORES.

991,665.

Specification of Letters Patent. Patented May 9, 1911.

Application filed October 29, 1910. Serial No. 589,718.

*To all whom it may concern:*

Be it known that I, CHARLES W. STUBBS, a citizen of the United States, residing at Maple Plain, in the county of Hennepin and State of Minnesota, have invented certain new and useful Improvements in Scrapers for Cleaning Lake and River Shores; and I do hereby declare the following to be a full, clear, and exact description of the invention, such as will enable others skilled in the art to which it appertains to make and use the same.

My invention has for its object to provide a simple and highly efficient device in the nature of a scraper especially adapted for use in cleaning weeds and mud from lake shores and to such ends the invention consists of the novel devices and combinations of devices hereinafter described and defined in the claims.

In the accompanying drawings which illustrate the invention, like characters indicate like parts throughout the several views.

Referring to the drawings, Figure 1 is a plan view of the improved scraper, some parts being broken away; Fig. 2 is a side elevation of the improved scraper and connections therefor; and Figs. 3 and 4 are sectional views taken on the line $x^3$ $x^4$ of Fig. 1 but illustrating different positions of the scraper blade.

In my improved device or scraper I employ a scraper blade which is mounted for vertical movements to and from operative position, upon a carriage of suitable construction which is preferably in the form of a large sled having runners adapted to run upon the lake shore or ground; and in connection therewith, I provide means for driving the carriage inward and outward over the shore and for automatically throwing the scraper blade into an operative position when the carriage is drawn toward the dry shore and for automatically raising the scraper blade when the carriage is drawn outward. A large and heavy sled is shown as made up of a pair of runners 1 and suitable transverse tie bars 2, $2^a$, $2^b$. The scraper blade 3, which is preferably of concave form, is shown as provided at the ends of the upper edge portion with coupling brackets 4 that are adjustably secured to levers 5, by means of slot and pin connections 6. The upper ends of the levers 5 are connected by links 7, to the front end portions of the runners 1 while the lower ends of said levers 5 are pivoted to bell cranks 8 which, in turn, are pivotally attached to the runners at 9. The lower arms of the bell cranks 8 are connected by draw links 10 to the arms of a drag bail 11. The front ends of the links 10 work through guide brackets 12 on the runners 1 and the said brackets are preferably provided with rollers 13 that directly engage the upper edge of said links. The curved scraper blade 3 works against the tie bar 2 and, when operative, is tightly pressed against the same. The tie bar $2^a$ limits the movements of the bell cranks 8, in a direction toward the right in respect to Fig. 4, as clearly shown in Fig. 4; and the said tie bar 2 limits the movement of said bell crank in the opposite direction, to a position clearly shown in Fig. 3, in which position the scraper blade is lowered into proper working position. This working position of the scraper blade may, as is evident, be varied by adjustments of the scraper blade on the levers 5 so as to thereby adapt the device for different conditions of the shore to be cleaned. Cutting blades 14 are secured to the front ends of the runners 1 and depend therefrom. Packers 15 are pivoted to the arms of the bail 11 and work immediately in front of the blades 14. These packers 15 are capable of pivotal movements 1 and 2, extreme positions thereof being shown in Figs. 3 and 4.

The device is preferably drawn to and from the dry shore or bank of the lake by a cable or similar flexible connection 16, one end of which is preferably provided with branches $16^a$ attached to the sides of the bail 11 and the other end of which is provided with branches $16^b$ attached to the upper arms of the bell cranks 8. The said cable branches $16^b$ are run over guide sheaves 17 journaled in brackets 18 secured on the rear portions of the runners 1. The cable 16 is adapted to be passed over guide sheaves 19 and 20, the former of which will be journaled to a suitable support on the dry lake shore or bank, while the latter will be journaled to a suitable support out in the lake; such for instance, as a pile or an anchored boat. For example: usually an engine will be employed for driving the cable to operate the scraper and this engine power may be applied to either one of the sheaves 19 and 20, or it may be applied in any other suitable way so far as my present invention is concerned. When the device is drawn outward from the dry shore, the tension on the cable will draw the parts into the position shown in Fig. 4 and the scraper will be lifted into an inoperative position, and the packers 15 will be turned backward, as also shown in Fig. 2, so that they will not impede the movement of the device. The scraper blade being pivotally connected to the levers 5 will swing upward so that they will not offer too great resistance against the water when the device is being moved outward from the shore. When the device is drawn inward toward the shore, the tension on the cable will force the parts into position shown in Fig. 3 and the scraper blade 3 will be lowered into its operative position and the packers 15 will then be turned backward, as also shown in Fig. 3. Under this operative or inward movement of the scraper, the scraper blade 3 will gather up weeds, soft mud, etc., and the blades 14 will cut the weeds at the runner lines, and furthermore, the so-called packers 15 will force the weeds downward to the bottom of the runners so that they will be engaged and cut by the said blades 14. Furthermore, the so-called packers will cause the front ends of the runners to raise over any obstruction such as a stone or mound of earth. The drag bail 11 being pivoted, will not be forced downward onto the ground when the device is being drawn outward from the shore and will not exert too great a lift on the front end of the device, when the device is being drawn toward the shore. In this way, the lake shore may be very completely and rapidly cleaned of weeds, mud, stones, and the like.

In some instances, it may be found very desirable to use wheels in connection with, or as substitutes for the runners so that it will be understood that the term carriage is herein used in a broad sense.

Instead of the plate-like form of scraper blade shown, a scraper in the form of a rake may be employed and, hence, it will be understood that the term scraper is herein used in a sense broad enough to include a rake.

The entire device is adapted to be operated without manual labor other than that required to operate an engine and controlling means.

The device, while especially designed for cleaning lake shores is, nevertheless, capable of many other uses, and is adapted for use in leveling ground, in grading, or excavating.

What I claim is:

1. In a device of the kind described, the combination with a carriage and a scraper mounted for movements thereon to and from operative position, of connections for moving said carriage to and fro on a distant point including means for automatically throwing said scraper into operative position when said carriage is drawn in one direction and for throwing said scraper into inoperative position when said carriage is drawn in the other direction.

2. In a device of the kind described, the combination with a carriage and a scraper thereon, of depending cutters arranged to work in front of said scraper approximately at the ends thereof, substantially as described.

3. In a device of the kind described, the combination with a carriage and a scraper thereon, of depending cutters arranged to work in front of said scraper approximately at the ends thereof, and packers arranged to work immediately in front of said cutters.

4. In a device of the kind described, the combination with a carriage and a scraper thereon, of depending cutters arranged to work in front of said scraper approximately at the ends thereof, and pivoted packers arranged to work just in front of said cutters.

5. In a device of the kind described, the combination with a carriage and bell cranks pivoted to the sides thereof for limited oscillatory movements, an operating connection attached to the upper and lower arms of said bell cranks and extended in reverse directions therefrom, and a scraper connected to said bell cranks and thereby arranged to be moved downward into an operative position when the carriage is drawn in one direction and to be moved upward into an inoperative position when said carriage is drawn in the other direction.

6. In a device of the kind described, the combination with a carriage and bell cranks pivoted to the sides thereof for limited oscillatory movements, of operating connections attached to the upper and lower arms of said bell cranks and extended in reverse directions therefrom, levers pivoted at the lower ends of said bell cranks, links connecting the upper ends of said levers to the sides of said carriage, and a scraper attached to said levers, substantially as described.

7. In a device of the kind described, the combination with a carriage and bell cranks pivoted to the sides thereof for limiting oscillatory movements, of operating connections attached to the upper and lower arms of said bell cranks and extended in reverse directions therefrom, levers pivoted to the lower ends of said bell cranks, links connecting the upper ends of said levers to the sides of said carriage, and a scraper attached to said levers and vertically adjusted thereon.

8. In a device of the kind described, the combination with a carriage and a scraper mounted for movements thereon to and from operative position, of connections for moving said carriage to and fro on a distant point including means for automatically throwing said scraper into operative position when said carriage is drawn in one direction and for throwing said scraper into an inoperative position when said carriage is drawn in the other direction, the said scraper being pivoted for upward swinging movements in one direction only.

9. In a device of the kind described, the combination with a carriage and bell cranks pivoted to the sides thereof for limited oscillatory movements, of operating connections attached to the upper and lower arms of said bell cranks and extended in reverse directions therefrom, levers pivoted at the lower ends of said bell cranks, links connecting the upper ends of said levers to the sides of said carriage, and a scraper pivotally attached to said levers and adapted to swing upward when the device is drawn outward from the shore, substantially as described.

In testimony whereof I affix my signature in presence of two witnesses.

CHARLES W. STUBBS.

Witnesses:
 HARRY D. KILGORE,
 FRANK D. MERCHANT.

Copies of this patent may be obtained for five cents each, by addressing the "Commissioner of Patents, Washington, D. C."